United States Patent Office.

PONTUS H. CONRADSON, OF BROOKLYN, NEW YORK, ASSIGNOR OF ONE-HALF TO ALBERT W. HALE, OF PLAINFIELD, NEW JERSEY.

PROCESS OF SURFACE-COATING IRON.

SPECIFICATION forming part of Letters Patent No. 311,294, dated January 27, 1885.

Application filed August 13, 1883. Renewed July 1, 1884. (Specimens.)

*To all whom it may concern:*

Be it known that I, PONTUS H. CONRADSON, a citizen of Sweden, and a resident of Brooklyn, in the county of Kings and State of New York, have invented certain new and useful Improvements in Processes of Surface-Coating Iron, of which the following is a specification.

My invention relates to the coating of iron and steel surfaces for protecting them against rust and corrosion—such as caused by the action of air and water—when such coating is produced by chemical action on the metal itself, as distinct from coatings which are applied by electroplating or by pigments, &c.

The invention consists in producing upon the surface of iron and steel articles and materials a thin coating of metallic sulphide or sulphuret by chemical action of sulphurous fumes or vapors upon the metal heated in the absence of air and such oxygen-containing gases which, by easily decomposing, might cause the metal to be attacked by free oxygen, and thus to oxidize it.

My preferred mode of procedure to effect the said coating is as follows: The articles of wrought-iron, cast-iron, or steel, or materials thereof—such as plates, bars, &c.—are inclosed in an air-tight chamber or muffle-oven, from which the air is expelled by introducing a current of carbonic acid, (which gas does not part with its oxygen except at higher temperatures than necessary to produce this coating.) The air being thus expelled, the materials are heated to about 500° to 600° centigrade. At the same time sulphur is vaporized by heating it in a separate retort, (at about 450° centigrade,) and the vapor generated is introduced into the muffle and allowed to act for a few minutes upon the surface of the aforesaid metal while the latter is kept at the aforesaid heat of 500° to 600°, thereby forming, by chemical action on the metal itself, a coating of sulphide of iron. If a thicker coating is desired, it is only necessary to allow the sulphur-vapor to act a little longer upon the metal. The metal is then left to cool in the muffle. The entire surface of the iron thus treated presents to the eye the ornamental yellowish luster peculiar to said sulphide, and leaves a permanent coating which is not affected by air or water, and not liable to rust and corrode.

In treating the iron it is not even necessary that rust previously formed upon the surface of the same should be first removed, as even the dust of the rust is converted into sulphide.

In treating the iron as aforesaid care should be taken not to increase the temperature to a red heat, as this would produce, with the sulphur-vapors, a proto-sulphide, which will not withstand the action of air and water, and will not prevent oxidation or rust.

Instead of sulphur-vapor formed by boiling the sulphur, as before stated, sulphureted hydrogen may be introduced; but the coating formed thereby (sesqui-sulphide, pyrrhotine, or magnetic pyrites) has a tendency to peel off, which is not the case with the bisulphide or common hard-iron pyrites formed by the aforesaid treatment.

Varieties of shades of color analogous to those produced by tempering steel may be obtained upon the sulphureted surface by admitting for a few moments (more or less, according to the color desired) a small quantity of air into the muffle after the iron has partly cooled.

To produce a greater variety of tints I coat the iron with another metal—such as copper—previous to submitting it to the action of the sulphurous vapor, thereby producing a coating of the mixed sulphides of the iron and copper. The peculiar brownish luster of the sulphide of copper produces, with the yellowish luster of the sulphide of iron, the desired effect.

The mode in which to coat the iron with copper is immaterial; but it may preferably be done by simply a brief immersion of the iron into a solution of a copper salt.

I am aware that it has been proposed long ago to color polished surfaces of copper by sulphureted hydrogen or other sulphurous vapors or liquids for the purpose of producing ornamentation, and I lay no claim to such coloring.

Having thus described my invention, I claim as new and desire to secure by Letters Patent—

1. The mode of protecting articles and materials of iron and steel from corrosion, which consists in forming a coating of sulphuret on their surfaces by chemical action.

2. The mode of protecting articles and materials of iron and steel from corrosion, which consists in forming a coating of sulphide on their surfaces by subjecting them in a heated state and in the absence of air to the action of vapor of sulphur.

In testimony that I claim the foregoing as my invention I have signed my name, in presence of two witnesses, this 2d day of August, 1883.

PONTUS H. CONRADSON.

Witnesses:
ROBT. W. MATTHEWS,
A. W. ALMQVIST.